Jan. 24, 1956

J. F. JONES 2,731,762

BUG AND MOSQUITO CATCHER

Filed June 1, 1954

James F. Jones
INVENTOR.

BY *Clarence A. O'Brien*
*and Harvey B. Jackson*
Attorneys

Jan. 24, 1956   J. F. JONES   2,731,762
BUG AND MOSQUITO CATCHER
Filed June 1, 1954   2 Sheets-Sheet 2

James F. Jones
INVENTOR.

United States Patent Office 2,731,762
Patented Jan. 24, 1956

2,731,762

BUG AND MOSQUITO CATCHER

James F. Jones, Snow Hill, N. C.

Application June 1, 1954, Serial No. 433,348

6 Claims. (Cl. 43—113)

This invention relates to apparatus for attracting and destroying insects such as mosquitos, tobacco flies, and the like, and pertains more particularly to improvements in such constructions tending to produce a more effective and desirable insect catcher.

A primary object of this invention is to provide an improved insect catcher which utilizes a source of light and has means for diffusing the same to attract the insects to the vicinity of the trap and in which the insects, when once attracted, will be enticed to fly into a body of liquid placed within the trap and thus destroy themselves.

Still another object of this invention is to provide an improved bug catcher which utilizes a source of light enclosed within screening or other foraminous material which, due to its construction, will diffuse the light emitted from the source and which will produce a soft glow of light which is attractive to insects to attract them to the vicinity of the catcher.

A further object of this invention is to employ the use of foraminous material coated with fluorescent paint, or the like, which, in conjunction with the above mentioned enclosing screening, will produce an effective attraction for insects.

A still further object of this invention is to provide an improved insect and bug catcher which employs a source of light so positioned with respect to a body of insect destroying liquid as to reflect the light from the surface of the liquid into the region immediately surrounding the catcher so as to entice the insects to plunge into the liquid.

Still another object of this invention is to provide an improved bug catcher in conformity with the preceding object wherein a strip of fluorescent paint is employed near the surface of the liquid to further entice the insects into the body of the liquid.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
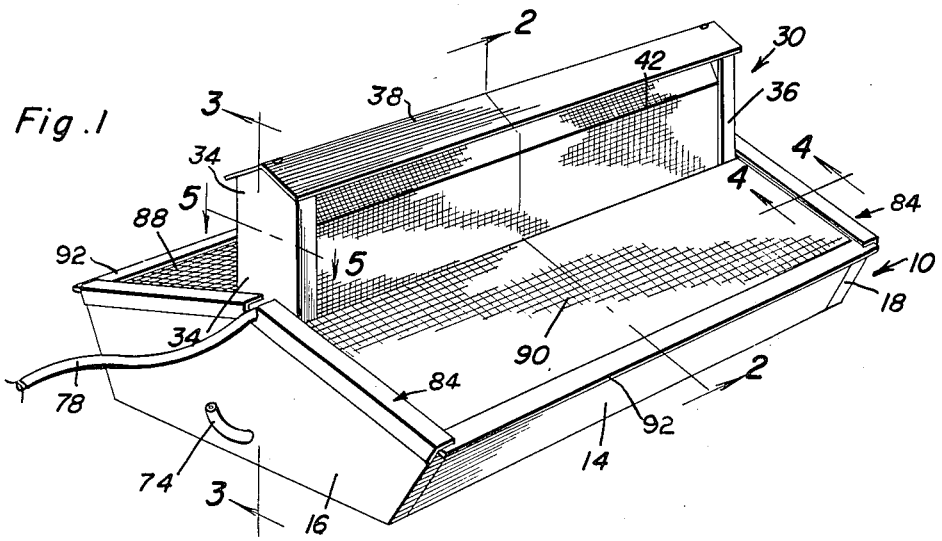
Figure 1 is a perspective view of the improved bug catcher.

Referring now more particularly to the drawings, the catcher will be seen to consist of a trough, indicated generally by the reference character 10, which is formed with the sloping side walls 12 and 14, the end walls 16 and 18 which are vertically arranged, and the metallic trough or liner 20 having a bottom 22, side walls 24 and 26 and the end walls 28 which bear upon the corresponding wall portions previously mentioned. The outer walls may be formed of wood and the liner is preferably formed of metallic material. It is to be understood that the entire trough may be formed of one piece, the essential feature residing in the fact that a liquid container is provided.

Figure 6:
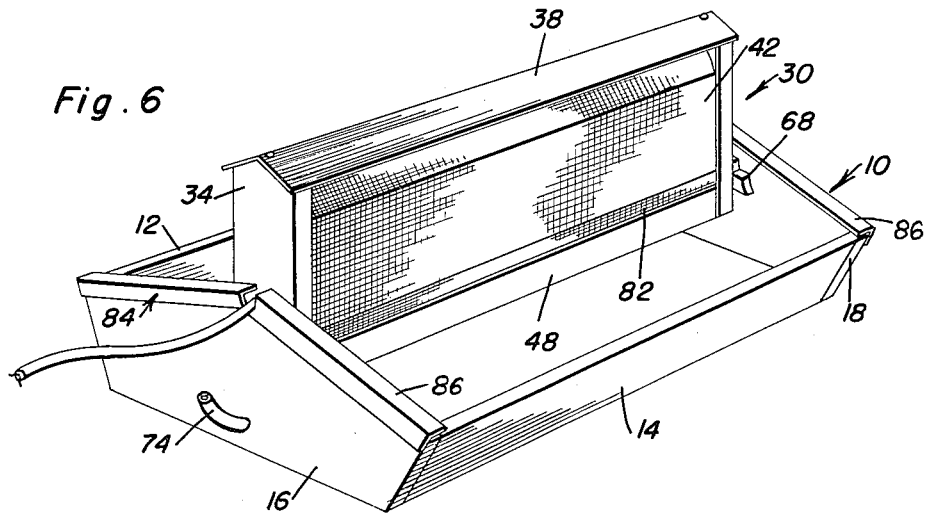
Figure 6 is a perspective view of the improved bug catcher with the cover screening removed.
Figure 3:
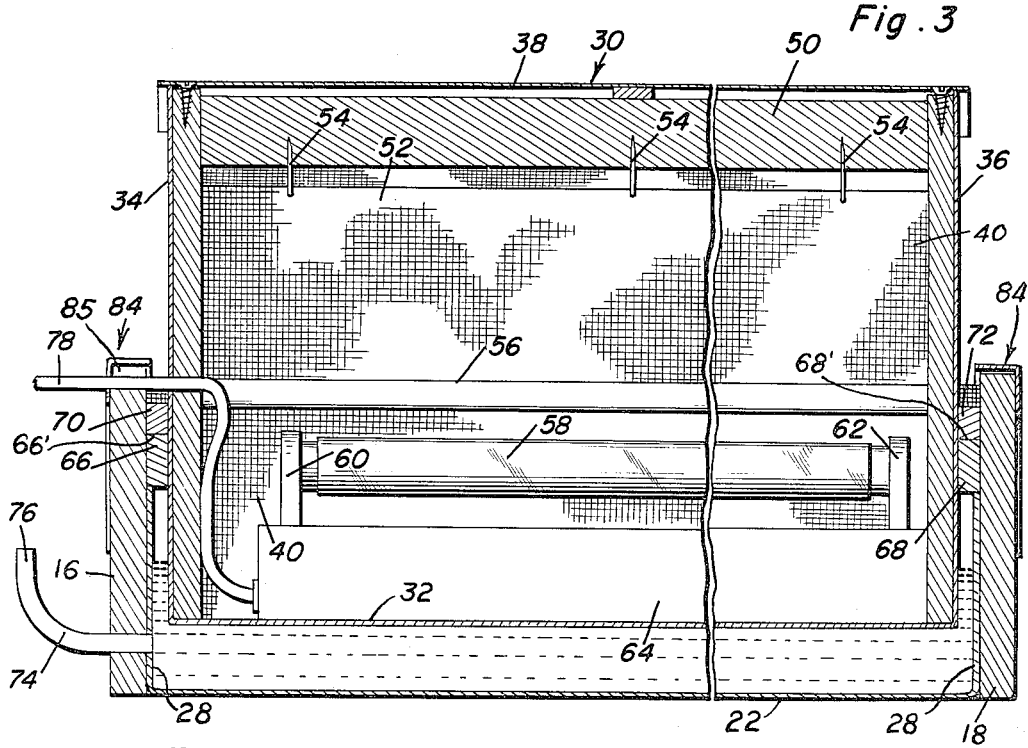
Figure 3 is a longitudinal vertical section taken substantially along the plane of section line 3—3 in Figure 1.

Longitudinally arranged in the trough and carried by the end walls 16 and 18 thereof is the attractor assembly, indicated generally by the reference character 30, which takes the form of an open framework having the bottom U-shaped member 32, as shown in Figure 6 with respect to end piece 34, the end pieces 34 and 36 which are U-shaped in cross-section, and the inverted V-shaped top piece 38.

The framework provides a support for the screen material 40 and 42 which is arranged on opposite sides thereof and will be seen to extend in such a manner as to completely cover the framework such that the enclosure 44 is provided therein. In this respect, the lower edges of the screen sheets 40 and 42 may be soldered or otherwise suitably secured to the upright flanges 46 and 48 of the bottom piece 32 and likewise secured along their vertical edges to the upright flanges of the end pieces 34 and 36, with their top edges frictionally engaged or clamped between the top piece 38 and a ridge strip 50 secured to and extended coextensively with the top piece 38.

A reflector sheet of screening or other foraminous material 52 is suspended from the ridge piece 50 by means of suitable fasteners such as hooks 54 and it is to be noted that the lower edge of this sheet is provided with a reinforcing strip 56 which serves to maintain the sheet in proper position spaced midway between the foraminous sheets 40 and 42. The reinforcing strip 56 is positioned immediately above a source of light 58 which takes the form of a fluorescent light tube carried by the conventional support brackets 60 and 62 which are, in turn, secured to a supporting block 64 secured to the bottom piece 32.

Figure 2:
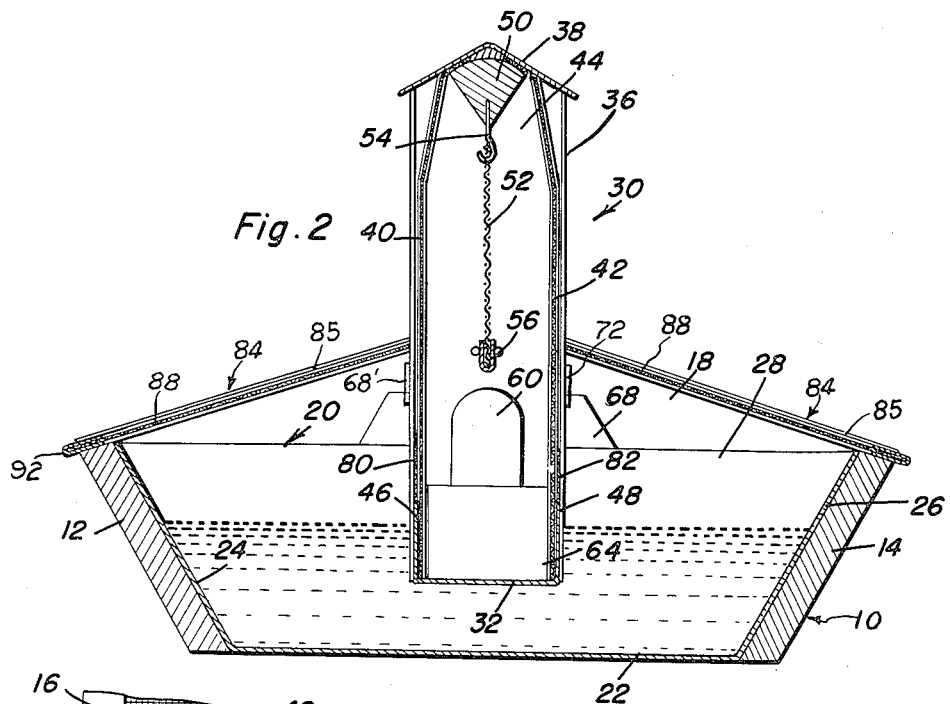
Figure 2 is a transverse vertical section taken substantially along the plane of section line 2—2 in Figure 1.
Figure 5:
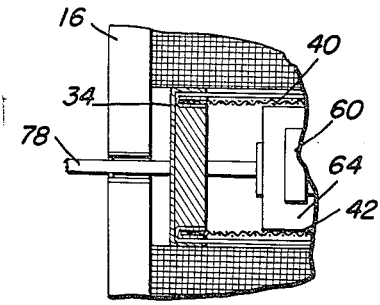
Figure 5 is an enlarged horizontal section taken substantially along the plane of section line 5—5 in Figure 1.

The inner surfaces of the end walls 16 and 18 are provided with the support blocks 66 and 68 which are provided with notches 66', 68' in their top edges, and one of which is best shown in Figure 2, and to receive the projections 70 and 72 rigid with the end pieces 34 and 36 of the attractor by means of which the attractor is removably positioned within the trough with its bottom piece 32 spaced slightly above the bottom 22 of the trough assembly.

An overflow pipe 74 communicates with the trough assembly and has its open upper end 76 positioned at such a height as to limit the level of liquid within the trough to a height somewhat below the height of the light assembly 58. The light is, of course, provided with a suitable current supply conduit or wire 78.

The foraminous sheet 52 is painted or coated with fluorescent material such as to produce a glow between the foraminous sheets 40 and 42 when the light source 58 is operating. This, taken in conjunction with the diffusing effect of the foraminous sheets 40 and 42 will present a very efficient attraction for insects, the attraction being effective over an extremely wide area. The trough assembly 10 is filled with water and a covering of kerosene, or the like, is poured over this body of water, such that insects attracted to the assembly and falling into the body of liquid will be destroyed.

For the purpose of enticing the insects to hurl themselves into the body of liquid, additional strips of screenings 80 and 82 are provided adjacent the lower edges of the sheets 40 and 42 in slightly spaced position above the surface of the liquid. These latter strips or sheets are heavily coated with a bright fluorescent paint such as to produce a very brilliant light source at this point which, taken in conjunction with the reflection of light emitted from the source 58 and reflecting from the surface of the body of liquid will produce a dazzling effect in the region of the surface of the liquid such as to entice the insects to fly thereinto.

Figure 4:
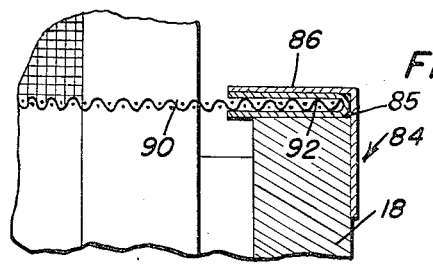
Figure 4 is an enlarged vertical section taken substantially along the plane of section line 4—4 in Figure 1.

It is to be noted that the upper edges of the end walls 16 and 18 are mutually convergent or peaked such as to reach their highest points at the center thereof and, as seen in Figure 4, these edges are provided with the track members of L-shaped configuration, as indicated by the reference character 84, such that the horizontal flange 86 is spaced slightly above the upper edge of the corresponding end wall to provide a trackway 85 therebetween. The cover screens 88 and 90 are provided with reinforcing strips 92 along their corresponding edges and their side edges are inserted in the trackways 85 between the horizontal flange 86 and the top edge of the end walls such as to be removably positioned in the manner shown in Figures 1 and 2 to provide a cover for the trough assembly. When these cover members are removed, the assembly takes the form as shown in Figure 6 of the drawings.

The cover members are very beneficial when it is desired to destroy only small insects such as mosquitos, and the like. Since this particular catcher is extremely effective for use against tobacco flies as well as other insects, their use in tobacco fields with the cover screens 88 and 90 removed, as shown in Figure 6, is very effective for destroying tobacco flies.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An insect catcher comprising an elongated trough adapted to receive a quantity of liquid, said trough including a pair of end walls interconnected by opposed side walls, an insect attractor assembly secured to and between said end walls and projecting upwardly therefrom, said assembly having an open framework covered on opposite sides with foraminous material, said opposite sides of the assembly being spaced inwardly of corresponding side walls of the trough, and an elongated illuminating tube carried by said assembly closely adjacent the surface of the liquid adapted to be placed in said trough, whereby the light emitted from said tube will be diffused by said foraminous material to attract insects and reflection of light from the surface of the liquid will entice insects to fly into the liquid.

2. A bug and mosquito catcher comprising a trough adapted to receive a quantity of liquid, an insect attractor assembly secured within said trough, and projecting upwardly therefrom, said assembly having an open framework covered on opposite sides with foraminous material, said opposite sides of the assembly being spaced inwardly from opposite sides of said trough, an elongated illuminating tube carried by said assembly closely adjacent the surface of the liquid adapted to be placed in said trough, whereby the light emitted from said tube will be diffused by said foraminous material to attract insects and reflection of light from the surface of the liquid will entice insects to fly into the liquid, and a reflector sheet carried by said assembly, and positioned above said tube between said foraminous material, said sheet being coated with fluorescent material.

3. An insect catcher comprising an elongated trough adapted to receive a quantity of liquid, said trough including a pair of end walls interconnected by opposed side walls, an insect attractor assembly secured to and between said end walls and projecting upwardly therefrom, said assembly having an open framework covered on opposite sides with foraminous material, said opposite sides of the assembly being spaced inwardly of corresponding side walls of the trough, an elongated illuminating tube carried by said assembly closely adjacent the surface of the liquid adapted to be placed in said trough, whereby the light emitted from said tube will be diffused by said foraminous material to attract insects and reflection of light from the surface of the liquid will entice insects to fly into the liquid, and a reflector sheet carried by said assembly and positioned above said tube between said foraminous material, said sheet being coated with fluorescent material.

4. A bug and mosquito catcher comprising a trough adapted to receive a quantity of liquid, an insect attractor assembly secured within said trough, and projecting upwardly therefrom, said assembly having an open framework covered on opposite sides with foraminous material, said opposite sides of the assembly being spaced inwardly from opposite sides of said trough, and an elongated illuminating tube carried by said assembly closely adjacent the surface of the liquid adapted to be placed in said trough, whereby the light emitted from said tube will be diffused by said foraminous material to attract insects and reflection of light from the surface of the liquid will entice insects to fly into the liquid, said foraminous material having strips, adjacent their lower edges, heavily coated with fluorescent material, to increase the enticement of the insects to the surface of the liquid.

5. A bug and mosquito catcher comprising a trough adapted to receive a quantity of liquid, an insect attractor assembly secured within said trough, and projecting upwardly therefrom, said assembly having an open framework covered on opposite sides with foraminous material, said opposite sides of the assembly being spaced inwardly from opposite sides of said trough, and an elongated illuminating tube carried by said assembly closely adjacent the surface of the liquid adapted to be placed in said trough, whereby the light emitted from said tube will be diffused by said foraminous material to attract insects and reflection of light from the surface of the liquid will entice insects to fly into the liquid, said trough having removable cover screens to prevent larger insects from reaching the surface of the liquid.

6. An insect catcher comprising an elongated trough adapted to receive a quantity of liquid, said trough including a pair of end walls interconnected by opposed side walls, an insect attractor assembly secured to and between said end walls and projecting upwardly therefrom, said assembly having an open framework covered on opposite sides with foraminous material, said opposite sides of the assembly being spaced inwardly of corresponding side walls of the trough, and an elongated illuminating tube carried by said assembly closely adjacent the surface of the liquid adapted to be placed in said trough, whereby the light emitted from said tube will be diffused by said foraminous material to attract insects and reflection of light from the surface of the liquid will entice insects to fly into the liquid, said trough having removable cover screens to prevent larger insects from reaching the surface of the liquid.

References Cited in the file of this patent

UNITED STATES PATENTS

| | | |
|---|---|---|
| 62,563 | Pitman | Mar. 5, 1867 |
| 897,919 | Muller | Sept. 8, 1908 |
| 1,076,019 | Clarke | Oct. 21, 1913 |
| 1,962,439 | Folmer et al. | June 12, 1934 |
| 2,645,877 | Pohlman | July 21, 1953 |